(12) United States Patent
Ruedle

(10) Patent No.: US 7,249,532 B2
(45) Date of Patent: Jul. 31, 2007

(54) DOUBLE CLUTCH TRANSMISSION

(75) Inventor: Harald Ruedle, Stuttgart (DE)

(73) Assignee: DaimlerChrysler A.G., Stuttgart (DE)

( * ) Notice: Subject to any disclaimer, the term of this patent is extended or adjusted under 35 U.S.C. 154(b) by 191 days.

(21) Appl. No.: 11/221,389

(22) Filed: Sep. 7, 2005

(65) Prior Publication Data

US 2006/0054441 A1     Mar. 16, 2006

(30) Foreign Application Priority Data

Sep. 11, 1920   (DE)   ................ 10 2004 043 939

(51) Int. Cl.
*F16H 3/08* (2006.01)
(52) U.S. Cl. .......................... 74/330; 74/331
(58) Field of Classification Search ............... 74/330, 74/331, 606 R
See application file for complete search history.

(56) References Cited

U.S. PATENT DOCUMENTS 6,055,879 A * 5/2000 Abe et al. .................. 74/335
6,755,090 B2 * 6/2004 Ima ............................. 74/330
6,856,880 B2 * 2/2005 Shimaguchi ................ 701/51

FOREIGN PATENT DOCUMENTS

| DE | 196 24 857 | 1/1997 |
|---|---|---|
| DE | 103 35 262 | 3/2005 |

\* cited by examiner

*Primary Examiner*—Tisha Lewis
(74) *Attorney, Agent, or Firm*—Klaus J. Bach

(57) ABSTRACT

In a double clutch transmission, particularly for front wheel drive cars with transversely mounted engines, the power path for the reverse speed extends through the same path as that for the second forward speed, both using the same input clutch, while the power path for the first forward speed extends through the other input clutch of the double clutch so that shifting between the reverse and first speeds can be accomplished under engine power.

12 Claims, 2 Drawing Sheets

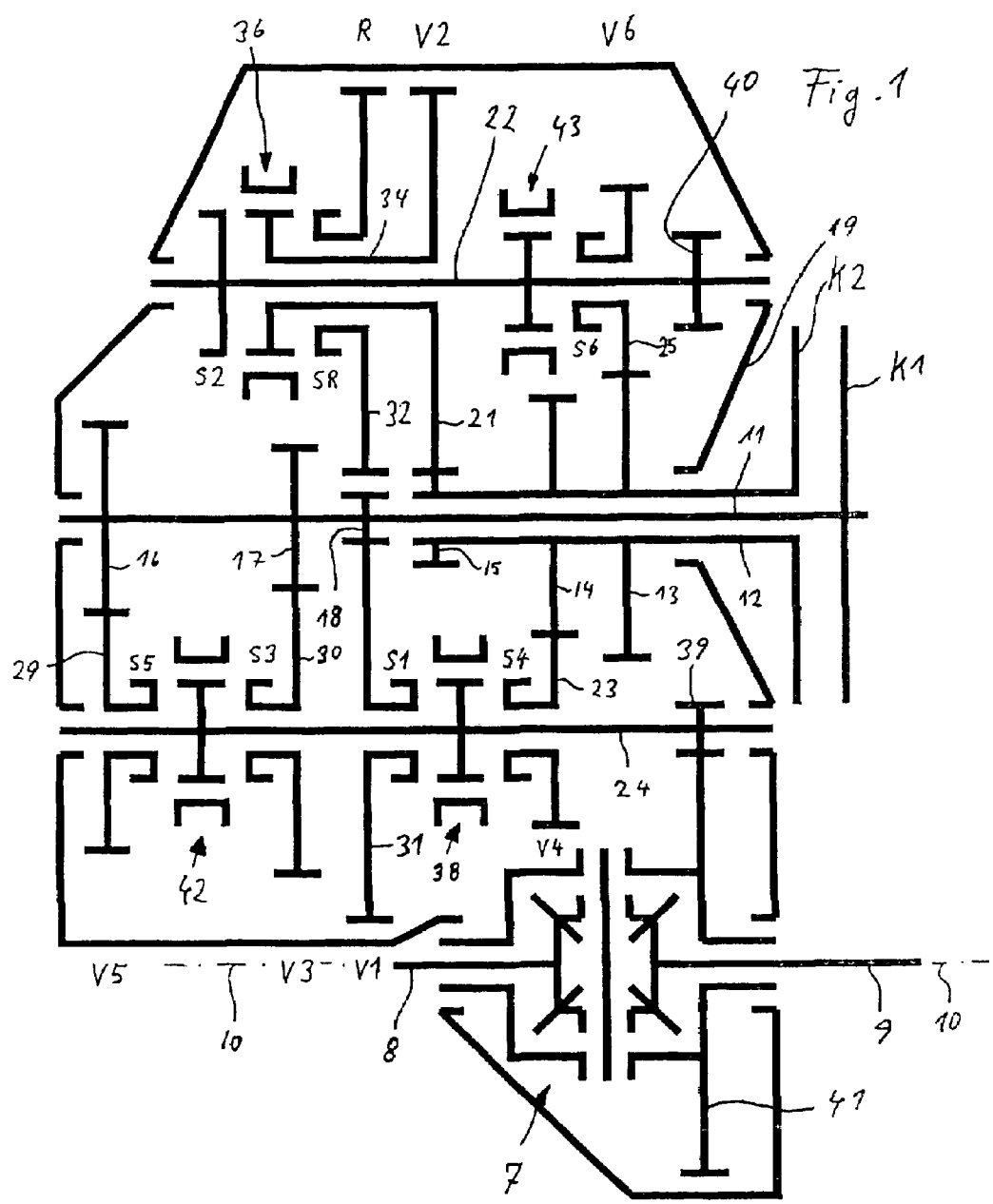

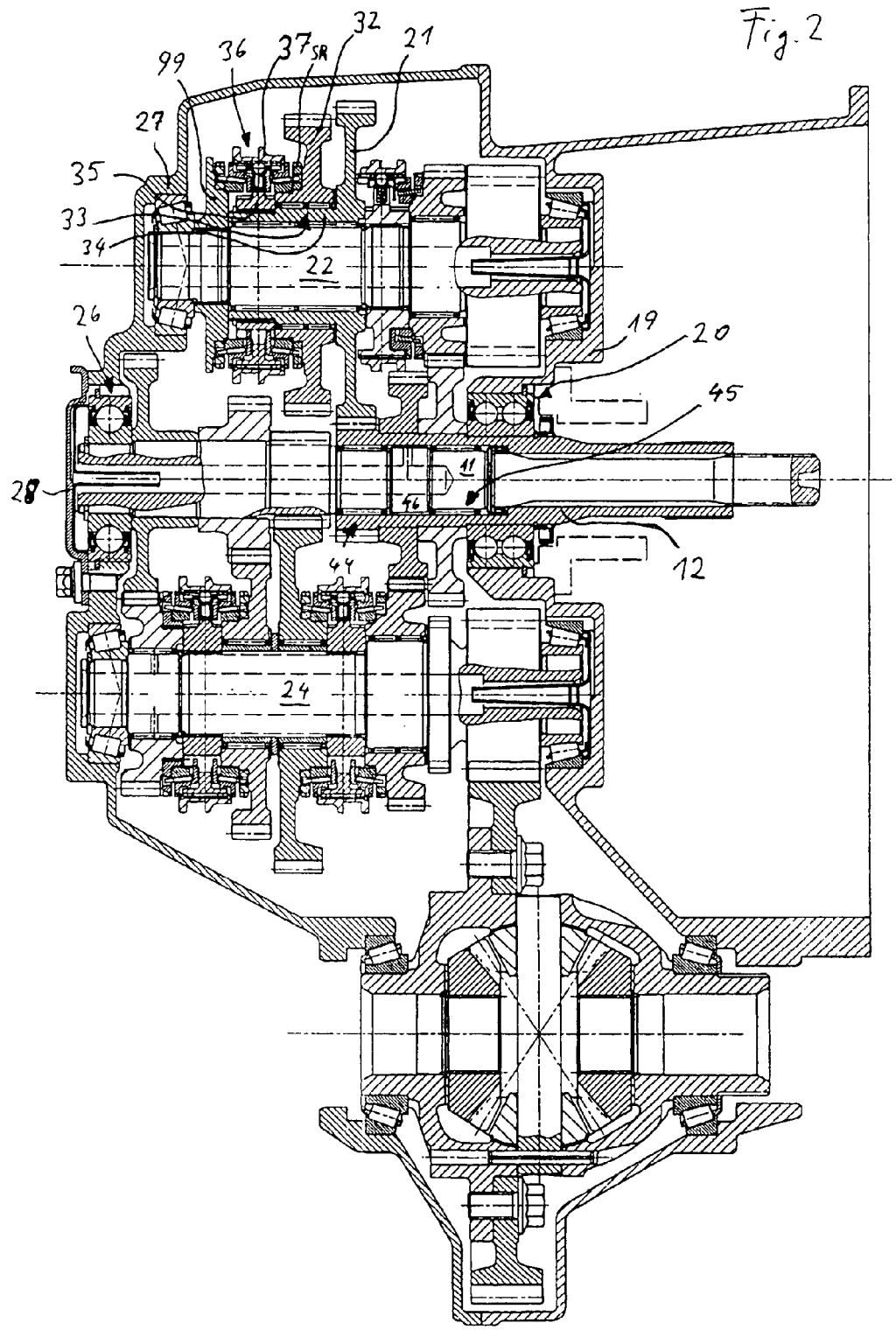

DOUBLE CLUTCH TRANSMISSION

BACKGROUND OF THE INVENTION

The invention relates to a double clutch transmission particularly for front wheel drive cars including two spaced parallel secondary shafts wherein the direction of rotation of an output shaft can be changed by two selectively engageable friction clutches.

Such a double clutch transmission is already known from DE 103 35 262.7.

Furthermore, DE 196 24 857 discloses a three shaft transmission which is axially relatively short.

It is the object of the present invention to provide a double-clutch transmission which is axially particularly short.

SUMMARY OF THE INVENTION

In a double clutch transmission particularly for front wheel drive cars with transversely mounted engines, the power path for the reverse speed extends through the same path as that for the second forward speed, both using the same input clutch while the power path for the first forward speed extends through the other input clutch of the double clutch so that shifting between the reverse and first speeds can be accomplished rapidly and under engine power.

With an alternate engagement and disengagement of the two friction clutches of the double clutch transmission, the driving direction can be changed. This is advantageous for a fast parking of passenger cars and trucks and vans. The driving direction can be changed without interruption of the torque.

It is particularly advantageous that also all the forward speeds may be engageable sequentially under load.

The switching between a low forward speed, particularly the first forward speed and reverse can be achieved by alternate engagement of the two friction clutches of the double clutch transmission without the need for operating a gear bush that is without changing gears. This is particularly advantageous with regard to short transition times from reverse to forward which is advantageous not only during parking operations but also when freeing a stuck vehicle by alternate forward and reverse operation of the drive wheels, for example to rock the vehicle with alternate forward and reverse wheel torque out of a sand depression. In this procedure, the inertia of the vehicle and load mass is utilized to support the drive force of the wheels whose gripping force at that point is not sufficient to move the vehicle. Under this circumstance, a double clutch transmission is particularly advantageous since it may be fully automatic so that also a fully automatic rocking cycle for freeing a stuck vehicle may be provided. Additionally, a semi-automatic operating procedure may be provided wherein the gear change is initiated by the driver. The gear change can be automatic if corresponding conditions are fulfilled. These conditions are for example:

Maintaining a maximum and minimum engine speed
A vehicle stabilization program such as an Electronic Stabilization Program ESP or an Antilock Braking System ABS or an Anti-Slip system ASR is inactivated.

The invention is particularly suitable for a front wheel drive motor vehicle with a transverse engine having a spur output gear for driving the differential which also includes a spur gear.

Since front wheel drive motor vehicles with longitudinally and transversely oriented front engines can relatively easily be developed into four-wheel drive cars, the transmission according to the invention may also be used in such an all wheel drive car. Since motor vehicles usually use the front wheels for steering an advantage of front wheel drive is that, because of the steering geometry, when negotiating a curve, a smaller torque needs to be transmitted to the drive wheels of front wheel drive cars. If the invention is used in connection with all wheel drive cars, high-torque engines can be used as their torque is distributed to at least two—in utility vehicles possibly even more—drive axles so that the torque to be transmitted by the steered vehicle wheels is correspondingly smaller.

The transmission may include a sleeve which is rotatably supported and arranged co-axially with a secondary transmission shaft. The sleeve carries a drive wheel firmly connected to the sleeve for rotation therewith. The drive wheel is arranged at the transmission input end and is disposed in the power path of the reverse speed and the second forward speed. If the transmission is in reverse, the power is transmitted to the wheels via one of the additional shafts, if the first forward speed is engaged the wheels are driven via the other additional shaft. The respective drive spur gears arranged on the additional shafts may have different diameters or transmission ratios with respect to the differential. The sleeve may also carry a gear which is rotatably supported on the sleeve and which is provided for reverse. The rigid mounting of the gear onto the sleeve prevents rattling of the gear on the sleeve when the transmission is subjected to vibrations and load impacts.

Preferably, the same output gear is used in the load path for the reverse speed as well as in the load path of the first forward speed. The input drive torque is transmitted via the different friction clutches of the double clutch. The output torque is transmitted via the same secondary shaft that is, respectively, the same output pinion. Since with this multiple use of gears space is saved, the double clutch transmission according to the invention is relatively short in axial direction and can be accommodated in a relatively narrow space between the weeks.

The invention will become more readily apparent from the following description of a preferred embodiment thereof with reference to the accompanying drawings.

BRIEF DESCRIPTION OF THE DRAWINGS

FIG. 1 shows schematically a double clutch transmission for a front wheel drive car with transversely mounted engine, and FIG. 2 is a cross-sectional view of a transmission as shown schematically in FIG. 1.

DETAILED DESCRIPTION OF A PARTICULAR EMBODIMENT

In the following description reference is made to FIG. 1 and FIG. 2 wherein design details however are sometimes shown only in FIG. 2, while FIG. 2 provides for a better overall view of the functional correlations of the various sets of gears. Shown is a double clutch transmission for transverse installation in the front of a motor vehicle. In the plane as shown in the Figs., an internal combustion engine is connected to the right end of the transmission. A differential drive 7 including the wheel drive shaft stubs 8, 9 for driving the front wheel drive axle 10 is shown in the Figs. at the bottom. The transmission shafts are shown for simplification in a single plane that is in the pane of the drawings. In reality, the four main shafts are displaced in parallel spatial relationship relative to one another.

The double clutch transmission includes two transmission input shafts 11, 12 of which one is a central input shaft 11 and the other is a hollow input shaft 12 through which the central input shaft 11 extends.

At the right end of the transmission adjacent the engine, the two friction clutches K1, K2 of the double clutch are disposed with their clutch plates mounted on the central and the hollow transmission input shafts. Each of the two clutches K1, K2 is engageable with the drive engine independently of the other in a manner which is not shown as it is well-known in the art. Between the double clutch and the gears disposed on the input drive shafts 11, 12, there is a transmission housing wall 19 in which the hollow input drive shaft 12 is supported by a non-friction bearing 20 in axial and in radial direction. The non-friction bearing 20 is in the form of a sealed double row groove ball bearing. The housing wall 19 extends radially outwardly and to the right and thereby forms a bell housing for receiving the double clutch.

Three gears 12, 14, 15 are firmly mounted on the hollow shaft 12 for rotation therewith with diameters which are smaller from the right to the left that is with increasing distance from the input end of the hollow shaft 12. The last gear 15 is formed integrally with the hollow shaft 12 while the two other gears 13, 14 are axially engaged between the gear 15 and the double row grooved ball bearing 20 and are pressed onto the hollow shaft 12. The last gear 15 is assigned to the second forward speed V2 and is in engagement with a gear 2 which is rotatably supported on the first (upper) secondary shaft 22. The second gear 14 is assigned to the fourth forward speed V4 and is in engagement with a gear 23 which is rotatably supported on a second (lower) secondary shaft 24. The third gear 13 is assigned to be sixth forward speed V6 and is engaged with a gear 25 rotatably supported on the first secondary shaft 22.

The two secondary shafts 22, 24 are provided at their opposite ends with trunnions which are rotatably supported by tapered roller bearings in a three-part transmission housing, comprising:
  an end wall 19 with a clutch bell housing formed therein
  a gear housing 27, and
  a main shaft cover 28.

The radially inner, that is, the central input shaft 11 axially projects from the hollow input shaft 12. On the section thereof projecting from the hollow input shaft 12 in the gear housing 27, the three gears 16, 17, 18 are firmly mounted onto the input shaft 11 for rotation therewith. The diameter of these three gears decreases from the left end, that is, the end opposite the input end, toward the right, that is toward the center of the transmission. At its outer left end, the central transmission input shaft 11 is supported in the transmission housing 27 by a sealed grooved ball bearing 26.

The largest diameter gear 16 of this group of fixed gears 16, 17, 18 of the central input shaft 11 is assigned to the fifth speed V5 and is in engagement with a gear 29 which is rotatably supported on the lower, that is, the second secondary shaft 24. The intermediate diameter fixed gear 17 of this group of fixed gears 16, 17, 18 of the central input shaft 11 is assigned to the third forward speed V3 and is in engagement with a gear 30 rotatably supported on the second secondary shaft 24. The smallest diameter fixed gear 18 of this group of fixed gears 16, 17, 18 of the central input shaft 11 is assigned to the first forward speed V1 and is in engagement with a gear 31 rotatably supported on the second secondary shaft 24. Consequently, all the fixed gears 16, 17, 18 of the central input shaft 11 are in engagement with gears 29, 30, 31 rotatably supported on the second secondary transmission shaft 24.

The gear 31 assigned to the first forward speed V1 is additionally in engagement with a freely rotatable gear 32, which is rotatably supported on an axially central area of a sleeve 34 by way of a double row needle bearing 33. The sleeve 34 is formed at its right end thereof integrally with the rotatably supported gear 21. At its left end, the sleeve 34 has a reduced diameter section which is splined and which carries the synchronizing body 35 of a gear change clutch 36. The shift sleeve 37 of this gear change clutch 36 is axially movable in both directions. When the shift sleeve 37 of the gear change clutch 36 is moved to the right, the sleeve 34 is engaged with the rotatable gear 32 for rotation therewith so that a torque can be transmitted from the second friction clutch K2 via the fixed gear 15, the gear 21 which is rotatably supported on the secondary shaft 22 and the gear 32 which is engaged with the gear 21 to the gear 31, which is rotatably supported on the second secondary transmission shaft 24.

To the right of the gear 31, there is a gear change clutch 38 co-axially with the second secondary transmission shaft 24. By way of this gear change clutch 38, the gear 31 can be coupled to the second secondary transmission shaft 24 for rotation therewith so that a torque can be transmitted to a drive pinion 39 mounted on the shaft 24 near the right end of the torque roller bearing supporting the shaft 24.

The small drive pinion 39 and a larger drive pinion 46 which is mounted on the first secondary transmission shaft 22 adjacent the tapered roller bearing thereof are both in engagement with the spur drive gear 41 of the differential 7.

The gear change clutch 38 can also be coupled to the gear 23 which is rotatably supported on the secondary transmission shaft 24 whereby a rotational connection is established between the second secondary shaft 24 and the gear 23 for the engagement of the fourth forward speed V4.

If the shift sleeve 37 mentioned earlier is moved to the left, the gear change clutch 36 establishes a firm rotational connection between the sleeve 34 and a splined shaft wheel 52 mounted on the first secondary shaft 22. In this way, the first secondary shaft 22 is connected for rotation with the sleeve 34. The drive torque of the second forward gear is then transmitted from the second friction clutch K2, via the hollow drive shaft 12, to the gear 15 and from there, via the gear 21 to the sleeve 34 and the clutch 36 and then to the splined shaft wheel 32 and to the first secondary transmission shaft 22 and finally from there via the drive pinion 10 to the gear 41 of the differential 7 and via the differential 7, to the drive shafts 8 and 9 of the drive wheels.

The shaft wheel S2 is mounted on the first secondary transmission shaft 22 for rotation with a synchronizing member 79 which is firmly mounted on the first secondary shaft 22 by a hub-shaft joint in the form of a splined wedge connection.

Further, another gear change clutch 42 is disposed axially between the two rotatable gears 29, 30 by which alternatively one of the two gears 27, 30 can be engaged for rotation with the second secondary shaft 24 so that the third forward speed V3 or alternatively the fifth forward speed V5 can be engaged.

Finally, a gear change clutch 43 is provided adjacent the rotatably supported gear 25 by which exclusively the rotatable gear 25 can be coupled with the first secondary transmission shaft for rotation therewith whereby the sixth forward speed V6 is engaged.

The central transmission input shaft 11 is supported within the hollow input shaft 12 by two needle bearings 44, 45. Axially between the two needle bearings 44, 45, the central shaft 11 has a larger diameter area 46. A bore extends axially into the central shaft 11 from the left end thereof, and at its inner end in the area 46 between the needle bearings 44, 45, a transverse bore is provided. Via the axial and the transverse bores lubricant and coolant is supplied to the two bearings. For supplying the lubricant and coolant to the axial bore, an insertion sleeve extends into the axial bore. In the area outside the axial bore the insertion sleeve is expanded outwardly at its outer end to the shape of a metal plate which is attached to the main shaft cover 28. The main shaft cover 28 consists of a relatively thick metal sheet and covers a circular opening on the transmission housing 27 in which the non-friction bearing 26 is accommodated. The shaft cover 28 is mounted to the housing 27 by screws.

The two secondary shafts 22, 24, have similar lubricant admission structures at the right ends of the shafts. These lubricant admission structures however are disposed directly in cavities formed into the end wall 19 of the transmission.

Furthermore, the two secondary shafts 22, 24 are provided with central through bores. The axial bore of the second secondary transmission shaft 24 is in communication with a transverse bore disposed in the area of the fifth forward speed.

With this double coupling transmission, power can be transmitted to the differential 7 or, respectively, the front wheel drive shafts in the following ways.

In the only reverse speed R from the second friction clutch K2.

In the first forward speed V1 from the first friction clutch K

In the second forward speed V2 from the second friction clutch K2

In the third forward speed V3 from the first friction clutch K1

In the fourth forward speed V4 from the second friction clutch K2

In the fifth forward speed V5 from the first friction clutch K1, and

In the sixth forward speed V6 from the second friction clutch K2.

As a result, in each speed can be shifted to a sequentially adjacent speed under load since a speed change is achieved by a change of the engagement of the friction clutches K1 and K2.

Instead of the synchronizing rings shown in the described embodiment shift claws may be used in a double clutch transmission wherein, with a change from one speed to the next, the clutches are activated anyhow.

In an alternative embodiment of the invention, the gear shift clutch 42 is arranged between the two gears of the central transmission input shaft so that, instead of the two gears 16, 17, being mounted for rotation with the central support shaft 11, these two gears are rotatably supported on the input shaft 11. Correspondingly, the two gears 23, 30, which are rotatably supported on the second secondary transmission shaft 24, these two gears are then firmly mounted on the second secondary transmission shaft 24.

The embodiments described are only exemplary. A combination of the various features is possible for different embodiments. Certain features which are not specifically described are apparent from the arrangements shown in the drawings.

What is claimed is:

1. A double clutch transmission, particularly for front wheel drive cars, including a central input shaft (11) and a hollow input shaft (12) through which the central input shaft (11) extends, a first and a second secondary transmission shaft (22, 24) arranged in spaced relationship parallel to said input shafts (11, 12), first and second clutches (K1, K2) mounted on the central and the hollow input shafts (11, 12) respectively, for switching the power transfer to said transmission between the central and the hollow input shafts (11, 12) for transmitting the power via different sets of gears of the transmission forming various transmission speeds, said speeds including a reverse speed (R) with a gear (32) rotatably supported via a gear sleeve (34) on said first secondary shaft (22) and being in engagement with a gear (31) associated with a low forward speed (V1), said gear sleeve (34) being rotatably supported on said first secondary transmission shaft (22) and arranged in the power flux of another forward speed (V2) and connected to a sleeve gear (21) assigned to this forward speed (V2).

2. A double clutch transmission according to claim 1, wherein said low forward speed is the first forward speed (V1).

3. A double clutch transmission according to claim 2, wherein said gear sleeve (34) and said sleeve gear (21) assigned to the first forward speed are coupled without circumferential play.

4. A double clutch transmission according to claim 1, wherein said gear sleeve (34) and said sleeve gear (21) assigned to the first forward speed are formed as a single part.

5. A double clutch transmission according to claim 1, the another forward speed (V2) is the second speed.

6. A double clutch transmission according to claim 5, wherein the sleeve gear (21) assigned to the another forward speed (V2) is in engagement with a gear (15) which is mounted on one of the two input shafts (12) for rotation therewith.

7. A double clutch transmission according to claim 6, wherein the concentric input shafts (11, 12) are supported relative to each other by antifriction bearings and the central input shaft (11) is provided at its end remote from the clutches (K1, K2) with a central bore for supplying lubricant to said antifriction bearings.

8. A double clutch transmission according to claim 7, wherein said transmission is disposed in a housing including an opening with a recess containing a bearing (26) supporting the central shaft at its end remote from said clutches K1, K2), said opening being covered by cover (28) including an oil supply structure for admitting oil to the central bore of the central input shaft (11).

9. A double clutch transmission according to claim 1, wherein said two secondary transmission shafts (22, 24) have drive pinions (29, 40) of different diameters.

10. A double clutch transmission according to claim 1, wherein each speed is shiftable to a sequentially next speed under load.

11. A double clutch transmission according to claim 10, wherein next to the gear set for said low forward speed (V1) two gear sets for forward speeds (V5, V3) are arranged on the central shaft (11) whereas next to the gear set for the another forward speed (V2) gear sets for two additional forward speeds (V4, V6) are arranged on the hollow drive shaft (12) of which one (V4) includes a gear (23) on the second secondary transmission shaft (24) and the other (V6) includes a gear (25) on the first secondary transmission shaft (22).

12. A double clutch transmission including two input shafts (11, 12) and two power input clutches (K1, K2) for supplying engine power to the transmission through various speed paths including at least a reverse speed path (R) a first forward speed path (11) and a second forward speed path (V2), a gear set for the reverse speed (R) disposed in sequential order with the first forward speed (V1) and the second forward speed (V2) of which the immediately adjacent first forward speed (V1) includes for the transmission of power a freely rotatable gear (31), which is also disposed in the power path through the transmission for the reverse speed (R) when the reverse speed is engaged and the reverse speed is assigned the same friction clutch K2 as the second forward speed (V2) so that power is transferred for these two gears (R, V2) via the same input gear (21) and the first forward speed is engageable by the other friction clutch (K1) so that the transmission can be shifted between first speed and reverse under power.

* * * * *